United States Patent [19]
Moore

[11] Patent Number: 5,300,267
[45] Date of Patent: Apr. 5, 1994

[54] RECLAIMER APPARATUS

[75] Inventor: Lawrence A. Moore, Lakeland, Fla.

[73] Assignee: Resource Recovery Technologies, Inc., Clearwater, Fla.

[21] Appl. No.: 950,729

[22] Filed: Sep. 24, 1992

Related U.S. Application Data

[63] Continuation of Ser. No. 597,400, Oct. 15, 1990, abandoned.

[51] Int. Cl.⁵ .............................................. B01D 11/02
[52] U.S. Cl. .................................. 422/286; 422/267; 422/287; 422/288; 521/47
[58] Field of Search ............... 422/267, 286, 287, 288, 422/131; 521/47

[56] References Cited

U.S. PATENT DOCUMENTS

| | | | |
|---|---|---|---|
| 4,164,484 | 8/1979 | Tokuda et al. | 521/46.5 |
| 4,212,848 | 7/1980 | Boehme et al. | 422/267 |
| 4,275,036 | 6/1981 | Perry et al. | 422/288 |

Primary Examiner—Joseph L. Schofer
Assistant Examiner—Tom Weber
Attorney, Agent, or Firm—A. W. Fisher, III

[57] ABSTRACT

A process and apparatus to reclaim solid polystyrene-type polymer material in solid form comprising a dissolving section to dissolve the solid polystyrene-type polymer material in a solvent including a dissolving tank to receive solvent from a solvent reservoir and the polystyrene-type polymer material from an external source to form a solution thereof and a recovery section including a recovery tank to receive the solution from the dissolving section, a separator unit to separate the dissolved polystyrene-type polymer material in solid form from the solvent, a solid material processing unit to remove the reclaimed polystyrene-type polymer material from the separator unit and a fluid separator/recovery unit to remove moisture from the separator unit and separate and recover the solvent from the water.

11 Claims, 5 Drawing Sheets

RECLAIMER APPARATUS

This application is a continuation of U.S. Ser. No. 597,400 filed Oct. 15, 1990, now abandoned.

BACKGROUND OF THE INVENTION

1. Field of the Invention

A process and apparatus to reclaim polystyrene-type polymer material.

2. Description of the Prior Art

Resin and plastic products such as molded products or foamed products of natural or synthetic resins permeate contemporary life. Unfortunately such resins are almost never decomposed by microorganisms. When such resins are burnt, toxic gases are generated which may corrode the furnace. Thus the disposal of waste resin products has become a serious problem. Some attempts at regenerating a resin from waste resin products have been proposed. For a polystyrene resin or the like, a method has been proposed wherein a waste polystyrene resin is burnt to be gasified and the gasified resin is separated to allow recovery of the resin. However, as may be apparent from this example, a process for reprocessing a waste resin and regenerating a resin therefrom requires a considerable investment in facilities and a high running cost. This process also results in a high energy consumption and has therefore not been frequently adopted in practice.

U.S. Pat. No. 4,104,341 shows a process for the manufacture of fibrids by dissolving, in a solvent, macromolecular waste materials from the bead polymerization of styrenes and introducing the solution into a precipitation medium under the action of shearing forces to form fibrids.

U.S. Pat. No. 4,164,484 discloses a process for classifying plastic-containing wastes by dissolving a mixture of plastics containing polyolefin-type plastics in a hydrocarbon solvent at a temperature between 60 and 80 degrees C., then vacuum-evaporating the solvent of the solution to cause precipitation of the polyolefin-type plastics dissolved therein, separating and recovering the major portion of the precipitate. The resulting separated solution is divided into the concentrated liquor of the precipitate remaining admixed in the separated solution and the phase of a solution containing the precipitate. The concentrated liquor is reused to dissolve the mixture of plastics. The solvent is removed from the phase of a solution hardly containing the precipitate so as to recover the polystyrene-type plastics. The process comprises connecting in series a plurality of solid-liquid separating devices, sequentially disintegrating and dispersing the precipitate separated by the separating device at a preceding stage in the separated solution flowing out from the separating device at a subsequent stage and again separating the precipitate by the separating device at a still subsequent stage.

U.S. Pat. No. 4,196,105 shows a process and apparatus for separating and recovering polystyrene with sulfur dioxide. The polystyrene is dissolved to form two phases, an upper phase which contains the polystyrene and a lower phase which contains the sulfur dioxide solvent which is practically free from polystyrene which can be reused. The polystyrene is recovered from the upper polystyrene containing phase by boiling off the sulfur dioxide.

U.S. Pat. No. 4,517,312 shows a process for regenerating a resin comprising the steps of dissolving a waste resin in an organic solvent to provide a resin solution, mixing the resin solution to provide a resin solution with a liquid of normal temperature, the liquid being immiscible with the solvent, scarcely dissolving the resin, and having a specific gravity less than that of the solvent and greater than that of the resin thereby separating the resin from a mixture of the resin solution and the liquid and recovering the resin. The liquid may have a temperature higher than the boiling point of the solvent. In this case, the solvent evaporation takes place together with the resin separation. The evaporated solvent is cooled later for recovery.

U.S. Pat. No. 4,857,587 shows a continuous flow process for the production of high impact polystyrene wherein specific types of polymerization inhibiting impurities are removed from the recycle stream prior to feeding or introducing the recycle stream into a styrene polymerization zone.

Additional examples of the prior art are disclosed in U.S. Pat. No. 3,311,675; U.S. Pat. No. 4,255,372 and U.S. Pat. No. 4,451,583.

SUMMARY OF THE INVENTION

The present invention relates to a process and apparatus to reclaim polystyrene-type polymer material comprising a dissolving section and a recovery section operatively coupled together to transfer fluid therebetween together with a heating source and cooling source each operatively coupled to both the dissolving section and recovery section to supply heating and cooling to both the dissolving section and recovery section.

The dissolving section comprises a dissolving tank to receive solvent from a solvent reservoir and solid polystrene-type polymer material from an external source, a first heat exchange operatively coupled to the heating source to receive heated fluid therefrom to heat solution circulated through the dissolving tank and a first condensing unit disposed in cooling relationship relative to the dissolving tank operatively coupled to the cooling source to receive cooled fluid therefrom to condense vapor within the dissolving tank. The dissolving section further includes a dissolving section control means to selectively control fluid flow through the dissolving section and to the recovery section.

The recovery section comprises a recovery tank to receive solution from the dissolving section, a second heat exchange operatively coupled to the heating source to receive heated fluid therefrom to heat solution circulated through the recovery tank, a separator means coupled to the recovery tank to receive solution therefrom and to separate the dissolved polystyrene-type polymer material in solid form from the solvent and a solid material processing unit to draw the solid form polystyrene-type polymer material from the separator means, to reduce the solid material to flakes and to collect the flakes for packing. The recovery section further includes a fluid separator/recovery means to separate water from the solvent and recycle the solvent for reuse in the dissolving section. The recovery section further includes a recovery section control means to selectively control fluid flow through the recovery section and to the dissolving section.

In use, polystyrene-type polymer material is placed in the dissolving tank as heated solvent is fed through the first heat exchange to the dissolving tank to dissolve the material into solution. The first condensing unit condenses any vapors within the dissolving tank. The solution is recirculated through the first heat exchange and dissolving tank to create or obtain a uniform homogeneous solution. The solution is then transferred to the recovery section where the second heat exchange maintains or reheats the solution circulated and recirculated through the recovery tank. The solution is then fed to the separator means where the polystyrene-type polymer material is separated from the solvent in continuous film strip solid form that is fed to the solid material processing unit where the continuous film strip solid form is reduced to flakes and collected for packing and shipping. The solution is continuously fed to the fluid separator/recovery means to condense vapor formed in the recovery tank and separator means and separate the solvent and water. The solvent is then recirculated to the dissolving section for reuse.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
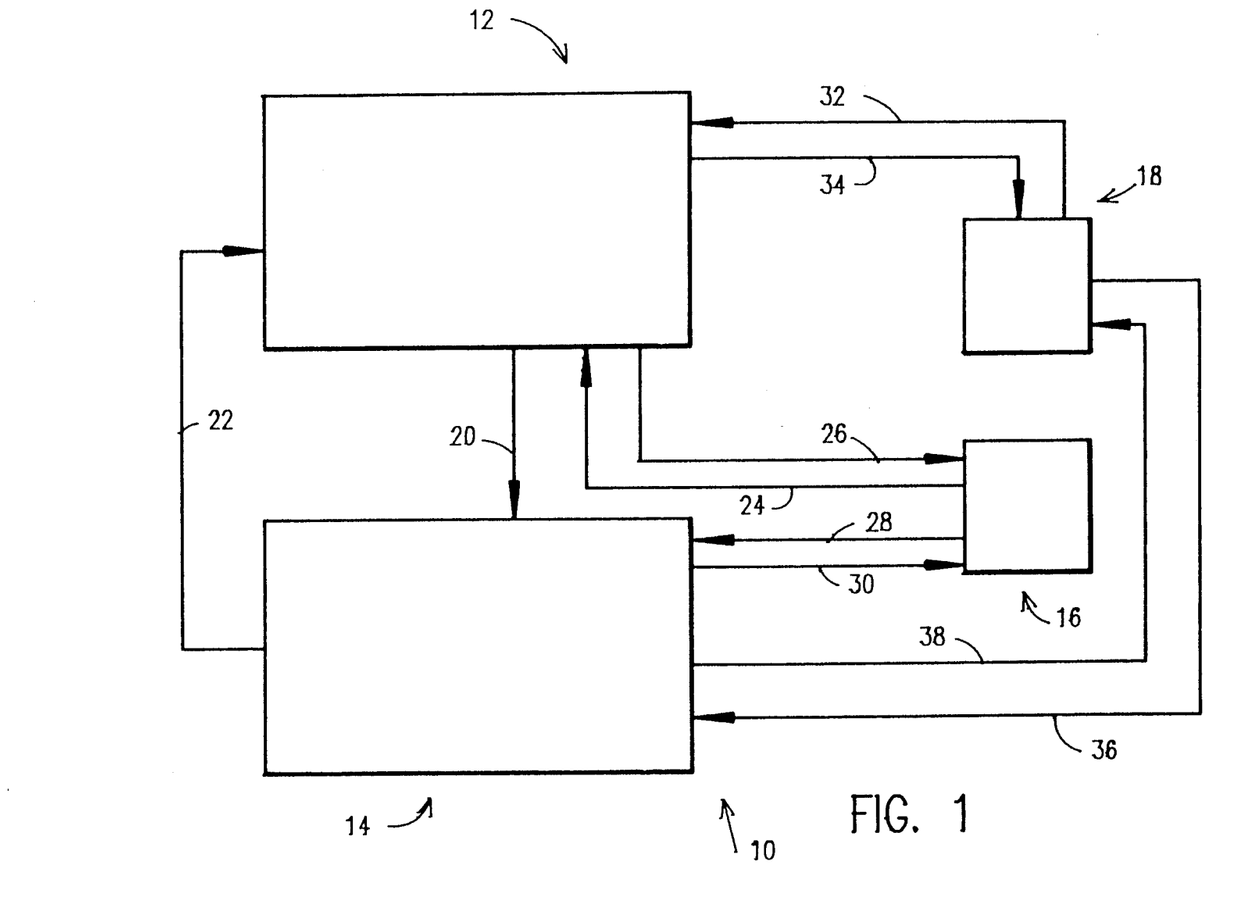
FIG. 1 is a schematic view of the reclaimer apparatus.

As best shown in FIG. 1, the present invention relates to a reclaimer apparatus generally indicated as 10 comprising a dissolving section and a recovery section generally indicated as 12 and 14 respectively in combination with a heating source such as a steam generator and a cooling source generally indicated as 16 and 18 respectively. The dissolving section and recovery section 12 and 14 are operatively coupled together by a first and second fluid conduit indicated as 20 and 22 respectively to transfer fluid therebetween.

The heating source 16 is operatively coupled to the dissolving section 12 by a first and second dissolving heating fluid conduit indicated as 24 and 26 respectively and to the recovery section 14 by a first and second recovery heating fluid conduit indicated as 28 and 30 respectively to selectively transfer heating fluid to and from the dissolving section 12 and the recovery section 14. The cooling source 18 is operatively coupled to the dissolving section 12 by a first and second dissolving cooling fluid conduit indicated as 32 and 34 respectively and to the recovery second 14 by a first and second recovery cooling fluid conduit indicated as 36 and 38 respectively to selectively transfer cooling fluid to and from the dissolving section 12 and the recovery section 14.

Figure 2:
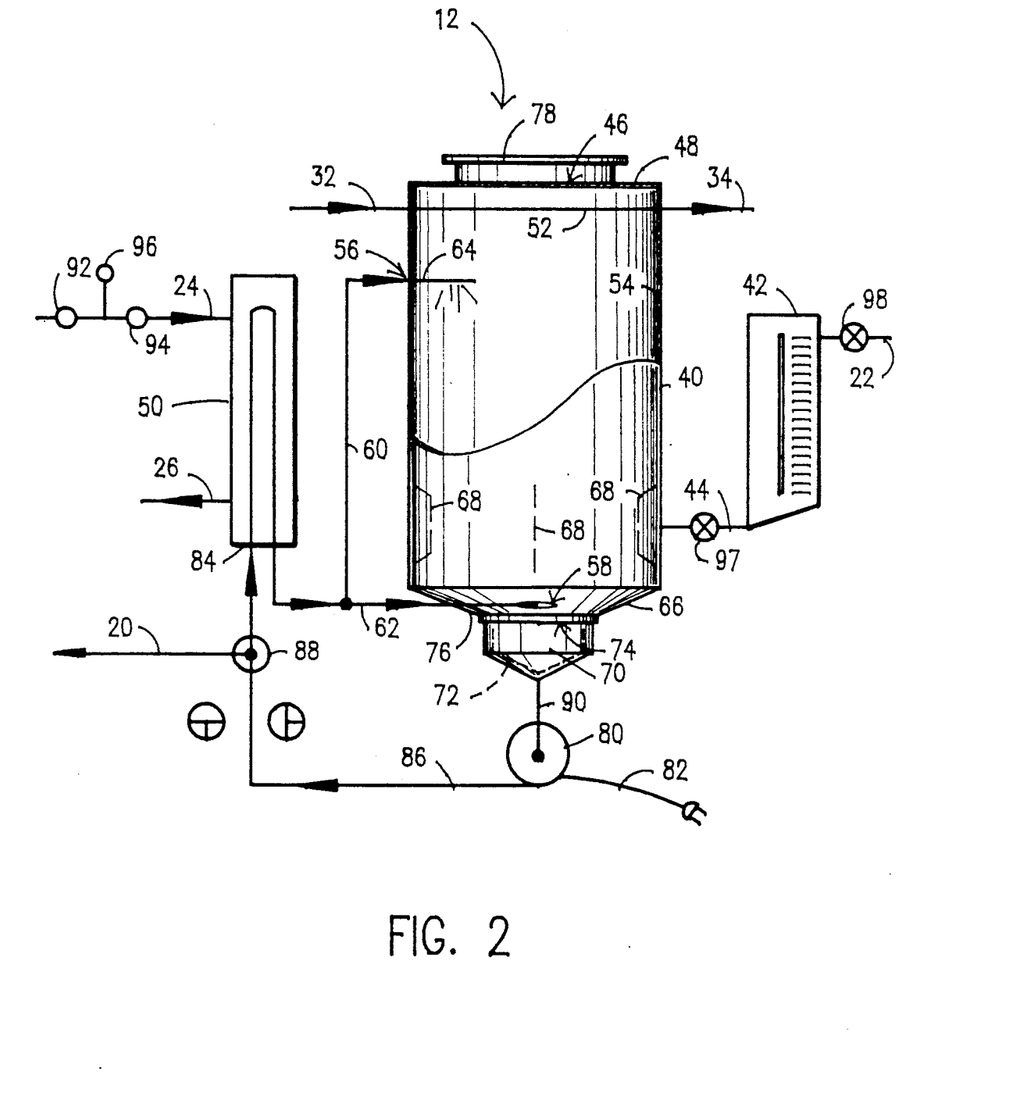
FIG. 2 is a detail view of the dissolving section of the reclaimer apparatus.

As best shown in FIG. 2, the dissolving section 12 comprises a dissolving tank 40 to receive solvent from a solvent reservoir 42 through a solvent supply conduit 44 and solid polystyrene-type polymer material through a centrally disposed inlet 46 formed in the top 48 of the dissolving tank 40 from an external source (not shown). A first heat exchange 50 is operatively coupled to the heating source 16 through the first and second dissolving heating fluid conduits 24 and 26 to receive heating fluid from the heating source 16 to heat solution circulated through the dissolving tank 40 to at least 190 degrees F and a first condensing unit or coil 52 disposed in the upper portion 54 of the dissolving tank 40 operatively coupled to the cooling source 18 through the first and second dissolving cooling conduits 32 and 34 to circulate cooling fluid from the cooling source 18 through the first condensing unit or coil 52 to condense vapor within the dissolving tank 40.

The dissolving tank 40 includes an upper and lower fluid inlet indicated as 56 and 58 respectively to supply heated solution from the first heat exchange 50 to the dissolving tank 40 through a first and second solution supply conduit indicated as 60 and 62 respectively. The first solution supply conduit 60 includes a nozzle or spray 64 extending into the interior of the dissolving tank 40 above the material disposed therein to dissolve the material; while, the lower fluid inlet 58 comprises an elongated aperture disposed tangentially relative to the frustrum conical lower portion 66 of the dissolving tank 40 to circulate solution therein. A plurality of baffles each indicated as 68 extend inwardly from the interior of the dissolving tank 40. The dissolving tank 40 further includes a split cone 70 having a perforated basket 72 adjacent an outlet 74 formed on the bottom 76 thereof to collect solid foreign objects therein. A cover or cap 78 is used to close the centrally disposed inlet 46 when the reclaimer apparatus 10 is in operation.

The dissolving section 12 further includes a dissolving section control means to selectively control fluid through the dissolving section 12 and to the recovery section 14. The dissolving section control means includes a first pump 80, electrically connected to an electrical source (not shown) by a conductor 82, operatively coupled to a heater inlet 84 through a pump outlet conduit 86 and an outlet fluid flow control valve 88 movable between a first and second position to the recovery section 14 through the pump outlet conduit 86, fluid flow control valve 88 movable between a first and second position and first fluid conduit 20, and to the outlet 74 of the dissolving tank 40 through a pump inlet conduit 90. The dissolving section control means further includes a first heat exchange control means comprising a pressure reducing valve 92 to control the pressure of fluid flow from the heating source 16 to the first heat exchange 50, flow control valve 94 movable between a first and second position to selectively control the flow of fluid between the first heat exchange 50 and the heating source 16 and a pressure gauge 96 to monitor the pressure of fluid fed to the first heat exchange 50. The dissolving section control means also includes a solvent supply control means comprising a first solvent flow control valve 97 movable between a first and second position to selectively control the flow of solvent from the solvent reservoir 42 through the solvent supply conduit 44 to the dissolving tank 40 and a second solvent flow control valve 98 movable between a first and second position to selectively control the flow of solvent to the solvent reservoir 42 from an external source (not shown) or from the recovery section 14 through the second fluid conduit 22.

Figure 3:
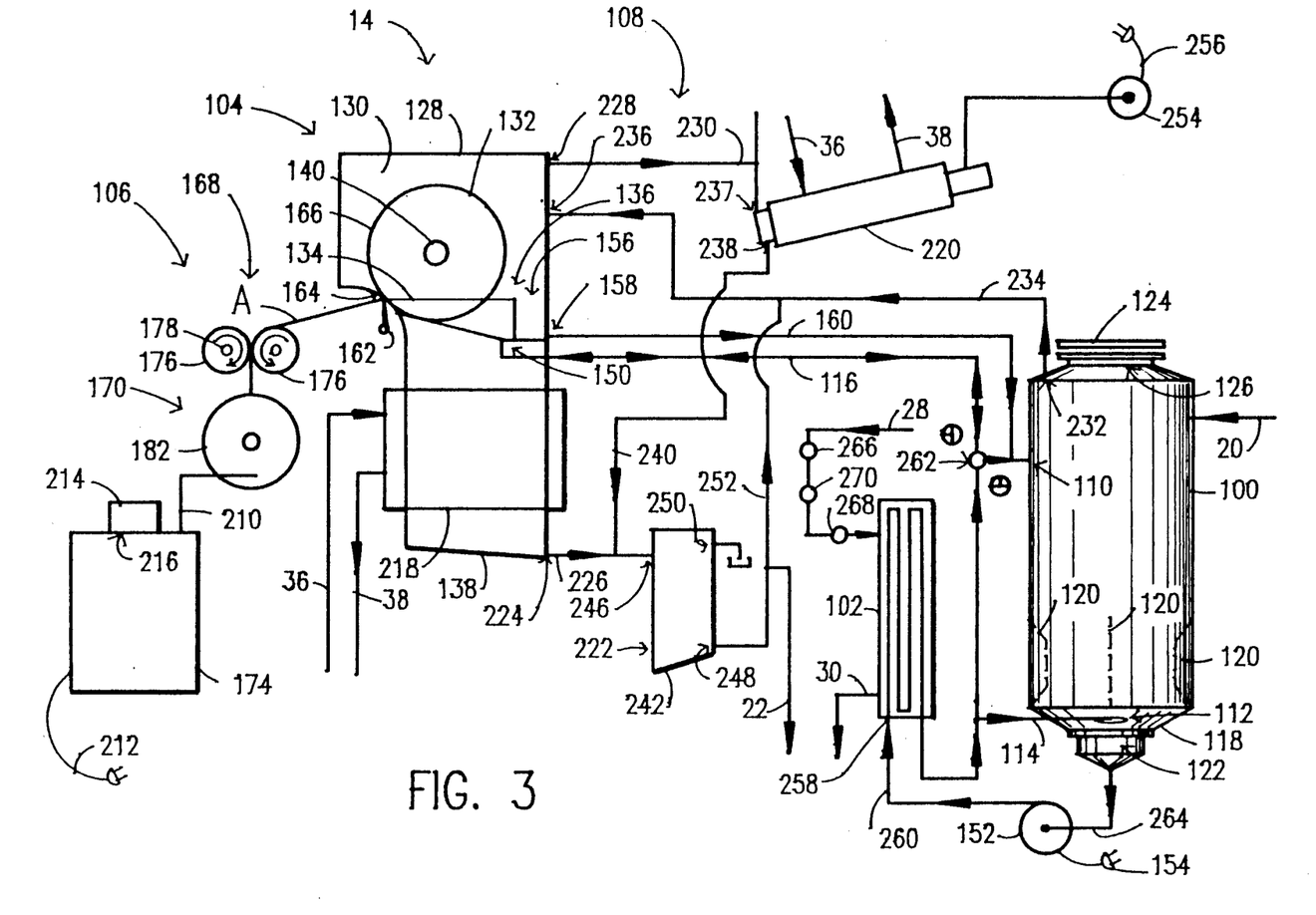
FIG. 3 is a detail view of the recovery section of the reclaimer apparatus.

As best shown in FIG. 3, the recovery section 14 comprises a recovery tank 100 to receive solution from the dissolving section 12 through the first fluid conduit 20, a second heat exchange 102 operatively coupled to the heat source 16 through the first and second recovery heating fluid conduits 28 and 30 to heat or reheat solution circulated through the recovery tank 100, a separator means generally indicated as 104 coupled to the second heat exchange 102 to receive solution therefrom and to separate the dissolved polystyrene-type polymer material in solid form from the solvent and a solid material processing unit generally indicated as 106 to draw the solid polystyrene-type polymer material from the separator means 104, to reduce the solid material to particulate form and to collect the particulate material for packing and shipping. The recovery section 14 further includes a fluid separator/recovery means generally indicated as 108 to separate water from the solvent and recycle the solvent for reuse in the dissolving section 12.

The recovery tank 100 includes an upper and lower fluid inlet indicated as 110 and 112 respectively. Heated solution of at least 190 degrees F. from the second heat exchange 102 is selectively fed to the recovery tank 100 or separator means 104 through a first and second solution supply conduit indicated as 114 and 116 respectively. The lower fluid inlet 112 comprises an elongated aperture disposed tangentially relative to the frustrum conical lower portion 118 of the recovery tank 100 to circulate solution therein. A plurality of baffles each indicated as 120 extend inwardly from the interior of the recovery tank 100 above the outlet 122 of the recovery tank 100. A cover or cap 124 permits selectively access to the interior of the recovery tank 100 through an inlet 126.

Figure 4:
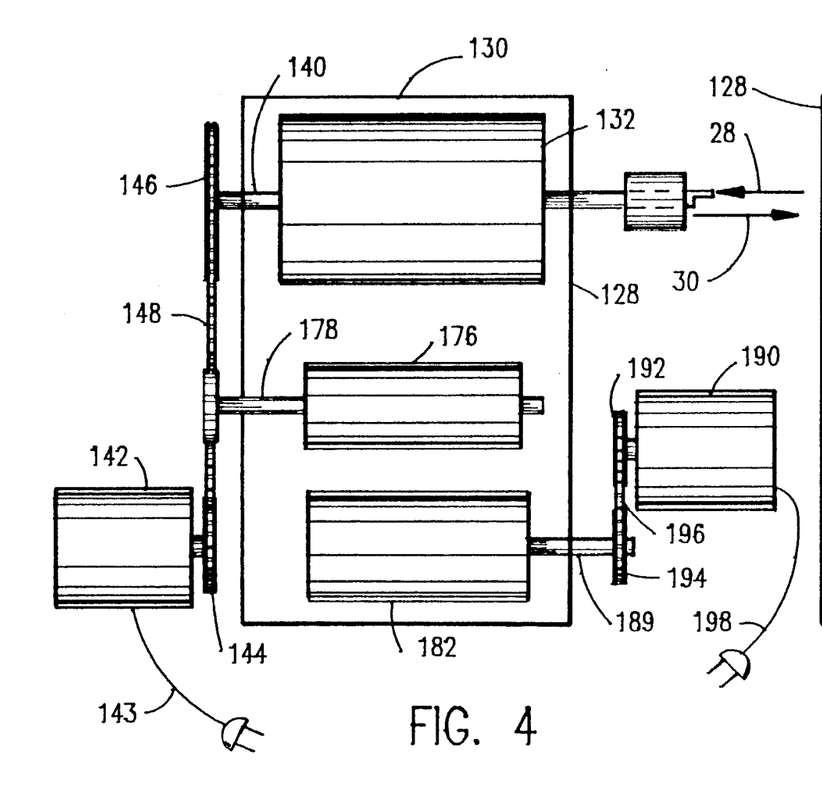
FIG. 4 is a partial end view of the separator means of the reclaimer apparatus.

The separator means 104 comprises a housing 128 including an upper hood 130 having a heated drum 132, solution pan 134 and solution level control generally indicated as 136 operatively disposed therein and a lower solvent collection tank 138. As best shown in FIG. 4, the heated drum 130, operatively coupled to the heating source 16 by the first and second recovery fluid conduits 28 and 30, is mounted on a shaft 140 coupled to a first motor 142, electrically connected to an electric source by a conductor 143 by a first and second sprocket indicated as 144 and 146 respectively, and a drive chain 148 to rotate the heated drum 130 maintained at least at 250 degrees F. through solution retained in the solution pan 134 fed from the second heat exchange 102 through the second solution supply conduit 116 and solution pan port 150 under the positive pressure of a second pump 152, electrically connected to an electric source by a conductor 154. As best shown in FIG. 3, the solvent collection tank 138 is disposed beneath the upper hood 130 to receive heavier than air vaporized solvent therefrom. The solution level control 136 comprises a solution trough 156 disposed adjacent the heated drum 132, solution overflow outlet 158, solution overflow conduit 160 and, the upper fluid inlet 110 such that when the solution level exceeds a predetermined level in the solution pan 134 the solution overflows into the solution trough 156 and returns to the recovery tank 100 through the solution overflow outlet 158, solution overflow conduit 160 and the upper fluid inlet 110.

Figure 5:
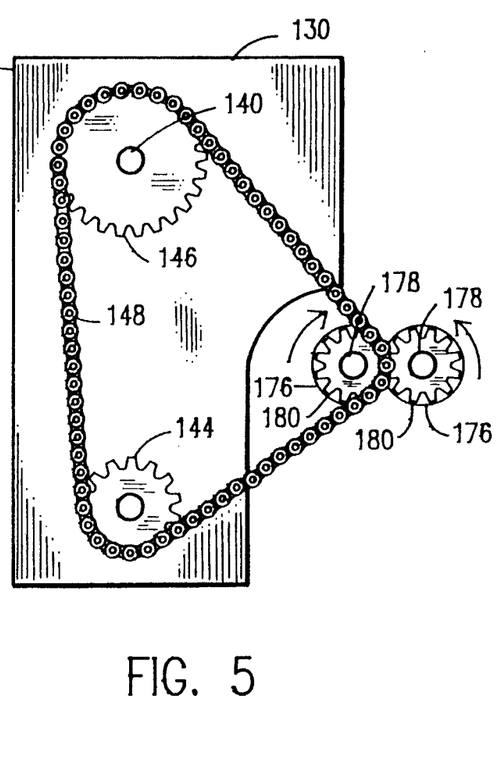
FIG. 5 is a partial end view of the separator means.

The solid material processing unit 106 comprises a material take-off blade 162 extending through a slot 164 formed in the upper hood 130 disposed immediately adjacent the circumference 166 of the heated drum 132, a material take-off mechanism generally indicated as 168, a particle generator generally indicated as 170 and a vacuum collector 174. The material take-off mechanism 168 comprises a pair of substantially cylindrical pull rollers each indicated as 176 disposed in operative engagement relative each other. As best shown in FIGS. 4 and 5, each of the substantially cylindrical pull rollers 176, mounted on a corresponding shaft 178, is operatively coupled to the first motor 142, by a corresponding sprocket 180 and the drive chain 148 to rotate the pull rollers 176 in opposite directions to pull or draw the material A shaved from the circumference 166 of the heated drum 132 by the material take-off blade 162 and through the slot 164. The substantially cylindrical pull rollers 176 are preferably brushes.

Figure 6:
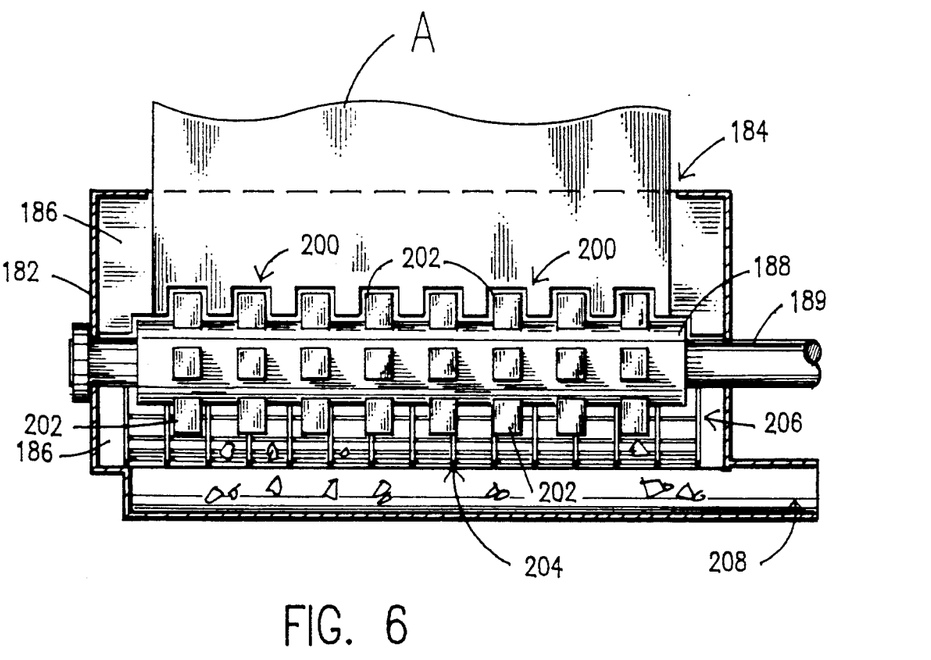
FIG. 6 is a detail cross-sectional end view of the particle generator.

As best shown in FIG. 6, the particulate generator 170 comprises a particulate housing 182 including an inlet slot 184 formed therein to receive the material A from the pull rollers 176 and having a stationary and rotatable cutting element indicated as 186 and 188 respectively disposed therein. As shown in FIG. 4, the rotatable cutting element 188, mounted on shaft 189, is operatively coupled to a second motor 190 by a first and second sprocket or pulley indicated as 192 and 194 respectively and drive chain or belt 196, electrically connected to an electric source by a electric conductor 198, to rotate the rotatable cutting element 188 relative to the stationary cutting element 186 to cooperatively sheer or form the material A into flakes or particles. The stationary cutting element 186 includes a plurality of notches each indicated as 200 and the rotatable cutting element 188 includes a corresponding plurality of teeth each indicated as 202 in registry therewith. A mesh 204 disposed around the cutting/shearing area 206 prevents particles greater than a predetermined size from being drawn through a particle outlet 208 formed in the lower portion of the particulate housing 182 and particle conduit 210 coupled to the vacuum collector 174. The vacuum collector 174, electrically connected to an electric source (not shown) by an electric conductor 212, includes a conventional vacuum generator to draw particles of less than a predetermined size from the particulate housing 182. A cap or cover 214 permits access to the interior of the vacuum collector 174 through a centrally disposed opening 216 for removal of particles of the polystyrene-type polymer material accumulated in the vacuum collector 174.

As best shown in FIG. 3, the fluid separator/recovery means 108 comprises a first and second condensing unit indicated as 218 and 220 respectively each operatively coupled to the cooling source 18 by the first and second recovery cooling fluid conduits 36 and 38 and a liquid separator or decanter generally indicated as 222 to separate water from the solvent. The first condensing unit 218 is disposed adjacent the lower solvent collection tank 138 to condense vaporized solvent therein that is fed to the liquid separator or decanter 222 through a solvent outlet 224 and solvent conduit 226. Lighter than air vapor is fed from the upper hood 130 through an upper hood vapor outlet 228 and upper hood vapor conduit 230, and from the recovery tank 100 to the upper hood 130 through a recovery tank vapor outlet 232, recovery tank vapor conduit 234 and upper hood vapor inlet 236 to the second condensing unit 220 through a second condensing unit inlet 237. The vapor condensed by the second condensing unit 220 is fed through a second condensing unit outlet 238 and condensing unit conduit 240 to the liquid separator or decanter 222.

The liquid separator or decanter 222 comprises a housing 242 having a decanter inlet 246 to receive liquid from the lower solvent collection tank 138 and the second condensing unit 220, a solvent outlet 248, and a water outlet 250. The solvent outlet 248 may be coupled to the solvent reservoir 42 through the second fluid conduit 22 and second flow control valve 98. The solvent outlet 248 is also coupled to the recovery tank vapor conduit 234 by a siphon break conduit 252 to permit entrained vapor to be fed to the upper hood 130. A fan 254 electrically connected to an electric source (not shown) by conductor 256 is coupled to the upper hood 130 through the second condensing unit to create a vacuum within the upper hood 130 to prevent vapor from escaping through the slot 164.

The recovery section 14 further includes a recovery section control means to selectively control fluid through the recovery section 14 and to the dissolving section 12. The dissolving section control means includes the second pump 152 operatively coupled to a heater inlet 258 through a pump outlet conduit 260, a fluid flow control valve 262 movable between a first and second position and to the outlet 122 of the recovery tank 100 through a pump inlet conduit 264. The recovery section control means further includes a second heat exchange control means comprising a pressure reducing valve 266 to control the fluid flow pressure of fluid flow from the heating source 16 to the second heat exchange 102, flow control valve 94 movable between a first and second position to selectively control the flow of fluid between the second heat exchange 102 and the heating source 16 and a gauge 270 to monitor the pressure of fluid fed to the second heat exchange 102.

In use, polystyrene-type polymer material is placed in the dissolving tank 40 as heated solvent preferably perchloroethylene is fed through the first heat exchange 50 to the dissolving tank 40 to dissolve the material into solution. The first condensing unit 52 condenses any vapors within the dissolving tank 40. With the outlet fluid flow control valve 88 in the first position, the solution is recirculated through the first heat exchange 50 and dissolving tank 40 to create or obtain a uniform homogeneous solution. With the outlet fluid flow control valve 88 in the second position, the solution is then transferred to the recovery section 14 where the second heat exchange 102 maintains or reheats the solution circulated and recirculated through the recovery tank 100. When the fluid flow control valve 262 is in the first position the solution is then fed to the separator means where the polystyrene-type polymer material is separated from the solvent in continuous film strip solid form A that is fed to the solid material processing unit 106 where the continuous film strip solid form A is reduced to flakes and collected for packing and shipping. The solution is continuously fed to the fluid separator/recovery means 108 to condense vapor formed in the recovery tank 100 and separator means 104 and separate the solvent and water. The solvent is then recirculated to the dissolving section 12 for reuse.

The pressure reducing valve 92 and pressure reducing valve 266 may be used to control the pressure of the steam fed from the heating source 16 to the first and second heat exchanges 50 and 102 to control the temperature therein.

Due to the high quality of the reclaimed material, different polymer materials may be blended and recycled without significant degradation.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A reclaimer apparatus comprising a dissolving section and a recovery section operatively coupled together by a first and second fluid conduit to transfer fluid therebetween in combination with a heating source and a cooling source, said heating source is operatively coupled to said dissolving section by a first and second dissolving heating fluid conduit and to said recovery section by a first and second recovery heating fluid conduit to selectively transfer heating fluid to and from said dissolving section and said recovery section, said cooling source is operatively coupled to said dissolving section by a first and second dissolving cooling fluid conduit and to said recovery section by a first and second recovery cooling fluid conduit to selectively transfer cooling fluid to and from said dissolving section and said recovery section, said dissolving section comprises a dissolving tank to receive solvent from a solvent reservoir through a solvent supply conduit and solid polystyrene-type polymer material through a centrally disposed inlet formed in the top of said dissolving tank from an external source, a first heat exchange operatively coupled to said heating source through said first and second dissolving heating fluid conduits to receive heating fluid from said heating source to heat solution circulated through said dissolving tank to at least 190 degrees F. and a first condensing unit disposed in the upper portion of said dissolving tank operatively coupled to said cooling source through said first and second dissolving cooling conduits to circulate cooling fluid from said cooling source through said first condensing unit to condense vapor within said dissolving tank, said dissolving tank including an upper and lower fluid inlet to supply heated solution from said first heat exchange to said dissolving tank through a first and second solution supply conduit, said first solution supply conduit includes a nozzle extending into the interior of said dissolving tank above the material disposed therein to dissolve the material and said lower fluid inlet comprises an elongated aperture disposed tangentially relative to a frustrum conical lower portion of said dissolving tank to circulate solution therein, said dissolving tank further includes a split cone having a perforated basket adjacent an outlet formed on the bottom thereof to collect solid foreign objects therein, said dissolving section further includes a dissolving section control means to selectively control fluid through said dissolving section and to said recovery section, said dissolving section control means includes a first pump operatively coupled to a heater inlet through a pump outlet conduit and an outlet fluid flow control valve movable between a first and second position to said recovery section through said pump outlet conduit, a fluid flow control valve movable between a first and second position and said first fluid conduit, and to said outlet of the dissolving tank through a pump inlet conduit, said dissolving section control means further includes a first heat exchange control means comprising a pressure reducing valve to control the pressure of fluid flow from said heating source to said first heat exchange, a flow control valve movable between a first and second position to selectively control the flow of fluid between said first heat exchange and said heating source, said dissolving section control means also includes a solvent supply control means comprising a first solvent flow control valve movable between a first and second position to selectively control the flow of solvent from said solvent reservoir through the solvent supply conduit to said dissolving tank and a second solvent flow control valve movable between a first and second position to selectively control the flow of solvent to said solvent reservoir from an external source or from said recovery section through said second fluid conduit, said recovery section comprises a recovery tank to receive solution from said dissolving section through said first fluid conduit, a second heat exchange operatively coupled to said heat source through said first and second recovery heating fluid conduits to heat or reheat solution circulated through said recovery tank, a separator means coupled to the second heat exchange to receive solution therefrom and to separate the dissolved polystyrene-type polymer material in solid form from the solvent and a solid material processing unit to draw the solid polystyrene-type polymer material from the separator means, to reduce the solid material to particulate form and to collect the particulate material for packing and shipping.

2. The reclaimer apparatus of claim 1 wherein said recovery section further includes a fluid separator/recovery means to separate water from the solvent and recycle the solvent for reuse in said dissolving section.

3. The reclaimer apparatus of claim 1 wherein said recovery tank includes an upper and lower fluid inlet, and wherein a heated solution from said second heat exchange is selectively fed to the recovery tank or said separator means through a first and second solution supply conduit, said lower fluid inlet comprises an elongated aperture disposed tangentially relative to said frustrum conical lower portion of said recovery tank to circulate solution therein.

4. The reclaimer apparatus of claim 1 wherein said separator means comprises a housing including an upper hood having a heated drum, solution pan and solution level control operatively disposed therein and a lower solvent collection tank, said heated drum, operatively coupled to said heating source by said first and second recovery fluid conduits, is mounted on a shaft coupled to a first motor by a conductor by a first and second sprocket respectively, and a drive chain to rotate said heated drum 130 through solution retained in said solution pan fed from said second heat exchange through said second solution supply conduit and a solution pan port under the positive pressure of a second pump, said solvent collection tank is disposed beneath said upper hood to receive heavier than air vaporized solvent therefrom, said solution level control comprises a solution trough disposed adjacent said heated drum, a solution overflow outlet, a solution overflow conduit and, said upper fluid inlet such that when said solution level exceeds a predetermined level in said solution pan, said solution overflows into said solution trough and returns to the recovery tank through said solution overflow outlet, said solution overflow conduit and said upper fluid inlet.

5. The reclaimer apparatus of claim 2 wherein said solid material processing unit comprises a material take-off blade extending through a slot formed in said upper hood disposed immediately adjacent the circumference of said heated drum, a material take-off mechanism, a particle generator and a vacuum collector, said material take-off mechanism comprises a pair of pull rollers disposed in operative engagement relative each other.

6. The reclaimer apparatus of claim 5 wherein said cylindrical pull rollers, mounted on a corresponding shaft, is operatively coupled to said first motor, by a corresponding sprocket and the drive chain to rotate the pull rollers in opposite directions to pull or draw the material shaved from said circumference of the heated drum by said material take-off blade and through said slot.

7. The reclaimer apparatus of claim 6 wherein said particulate generator comprises a particulate housing including an inlet slot formed therein to receive the material from said pull rollers and having a stationary and rotatable cutting element disposed therein, said rotatable cutting element, mounted on a shaft, is operatively coupled to a second motor by a first and second sprocket or pulley and a drive chain or belt, to rotate said rotatable cutting element relative to said stationary cutting element to cooperatively sheer the material into flakes or particles, said stationary cutting element includes a plurality of notches and said rotatable cutting element includes a corresponding plurality of teeth in registry therewith.

8. The reclaimer apparatus of claim 7 wherein a mesh is disposed around a cutting/shearing area to prevent particles greater than a predetermined size from being drawn through a particle outlet formed in the lower portion of said particulate housing and a particle conduit coupled to said vacuum collector.

9. The reclaimer apparatus of claim 1 wherein said fluid separator/recovery means comprises a first and second condensing unit each operatively coupled to said cooling source by said first and second recovery cooling fluid conduits and a liquid separator to separate water from the solvent, said first condensing unit is disposed adjacent said lower solvent collection tank to condense vaporized solvent therein that is fed to said liquid separator through a solvent outlet and a solvent conduit such that lighter than air vapor is fed from said upper hood through an upper hood vapor outlet and upper hood vapor conduit, and from said recovery tank to said upper hood through a recovery tank vapor outlet, a recovery tank vapor conduit and an upper hood vapor inlet to said second condensing unit through a second condensing unit inlet and vapor condensed by said second condensing unit is fed through a second condensing unit outlet and a condensing unit conduit to the liquid.

10. The reclaimer apparatus of claim 9 wherein said liquid separator also comprises a housing having a decanter inlet to receive liquid from said lower solvent collection tank and the second condensing unit, a solvent outlet and a water outlet.

11. The reclaimer apparatus of claim 1 wherein said recovery section further includes a recovery section control means to selectively control fluid through said recovery section and to said dissolving section, said dissolving section control means includes the second pump operatively complex to a heater inlet though a pump outlet conduit, a fluid flow control valve movable between a first and second position and to said outlet of said recovery tank through a pump inlet conduit, said recovery section control means further includes a second heat exchange control means comprising a pressure reducing valve to control the fluid flow pressure of fluid flow from said heating source to said second heat exchange, a flow control valve movable between a first and second position to selectively control the flow of fluid between said second heat exchange and said heating source and a gauge to monitor the pressure of fluid fed to said second heat exchange.

* * * * *